US010411621B2

(12) United States Patent
Hara et al.

(10) Patent No.: US 10,411,621 B2
(45) Date of Patent: Sep. 10, 2019

(54) DRIVE DEVICE FOR THREE-PHASE SYNCHRONOUS MOTOR

(71) Applicant: Hitachi Automotive Systems, Ltd., Hitachinaka-shi, Ibaraki (JP)

(72) Inventors: Takafumi Hara, Tokyo (JP); Toshiyuki Ajima, Tokyo (JP); Shigehisa Aoyagi, Tokyo (JP); Mitsuo Sasaki, Atsugi (JP); Takumi Hisazumi, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 19 days.

(21) Appl. No.: 15/736,233

(22) PCT Filed: Jun. 14, 2016

(86) PCT No.: PCT/JP2016/067648
§ 371 (c)(1),
(2) Date: Dec. 13, 2017

(87) PCT Pub. No.: WO2017/006719
PCT Pub. Date: Jan. 12, 2017

(65) Prior Publication Data
US 2018/0183366 A1 Jun. 28, 2018

(30) Foreign Application Priority Data

Jul. 3, 2015 (JP) .................................. 2015-134031

(51) Int. Cl.
H02P 6/12 (2006.01)
G01D 5/244 (2006.01)
(Continued)

(52) U.S. Cl.
CPC ................ H02P 6/12 (2013.01); B62D 5/049 (2013.01); B62D 5/0463 (2013.01);
(Continued)

(58) Field of Classification Search
CPC ...... H02P 6/12; H02P 6/08; H02P 6/16; H02P 6/182; B62D 6/12; B62D 6/08; B62D 6/16; B62D 6/182; G01D 5/244
(Continued)

(56) References Cited

U.S. PATENT DOCUMENTS

2006/0220607 A1* 10/2006 Imagawa ............... B62D 5/046
318/638
2011/0043146 A1* 2/2011 Sato ......................... H02P 6/12
318/400.04
(Continued)

FOREIGN PATENT DOCUMENTS

JP 8-336299 A 12/1996
JP 2006-273155 A 10/2006
(Continued)

OTHER PUBLICATIONS

International Search Report (PCT/ISA/210) issued in PCT Application No. PCT/JP2016/067648 dated Aug. 30, 2016 with English translation (5 pages).
Japanese-language Written Opinion (PCT/ISA/237) issued in PCT Application No. PCT/JP2016/067648 dated Aug. 30, 2016 (5 pages).

Primary Examiner — Jorge L Carrasquillo
Assistant Examiner — Devon A Joseph
(74) Attorney, Agent, or Firm — Crowell & Moring LLP

(57) ABSTRACT

In the drive device for a three-phase synchronous motor, if one of the two rotational position detectors is defective, it is necessary to identify the rotational position detector having abnormal output and is in the detective state. To do this, three or more rotational position detectors are required, which increases costs of the rotational position detectors. By comparing the outputs of two rotational position detectors, an abnormality of ether one of the two detectors is detected. The abnormal detector is identified with the use of rotational position estimating means. The drive of the three-phase
(Continued)

synchronous motor is controlled with the use of the output θ of the properly functioning one of the first and second rotational position detectors.

18 Claims, 6 Drawing Sheets

(51) Int. Cl.
  *H02P 6/16* (2016.01)
  *B62D 5/04* (2006.01)
  *H02P 6/08* (2016.01)
  *H02P 6/182* (2016.01)
(52) U.S. Cl.
  CPC ........... *B62D 5/0484* (2013.01); *G01D 5/244* (2013.01); *H02P 6/08* (2013.01); *H02P 6/16* (2013.01); *H02P 6/182* (2013.01)
(58) Field of Classification Search
  USPC ........................................................ 318/400
  See application file for complete search history.

(56) References Cited

U.S. PATENT DOCUMENTS

| 2012/0330490 | A1 | 12/2012 | Ozaki et al. |
| 2013/0253773 | A1* | 9/2013 | Itamoto .................. B62D 5/049 701/43 |
| 2013/0289826 | A1* | 10/2013 | Yoshitake .............. B62D 5/049 701/42 |
| 2015/0069941 | A1 | 3/2015 | Iwaji et al. |
| 2016/0231142 | A1* | 8/2016 | Kawano ............. G01D 5/24485 |
| 2017/0015348 | A1* | 1/2017 | Sasaki .................. B62D 5/0484 |

FOREIGN PATENT DOCUMENTS

| JP | 2007-209105 A | 8/2007 |
| JP | 2010-22196 A | 1/2010 |
| JP | 2010-156451 A | 7/2010 |
| JP | 2011-188683 A | 9/2011 |
| JP | 2014-87078 A | 5/2014 |
| WO | WO 2013/153657 A1 | 10/2013 |

* cited by examiner

DRIVE DEVICE FOR THREE-PHASE SYNCHRONOUS MOTOR

TECHNICAL FIELD

The present invention relates to a drive device for a three-phase synchronous motor such as an electric power steering device. The invention relates particularly to a drive device for a three-phase synchronous motor that controls a three-phase synchronous motor based on the output of a rotational position detecting unit that detects the position of the rotor of the three-phase synchronous motor.

BACKGROUND ART

In various fields including the industry, household electric appliance, and automobile, small-sized, high-efficiency three-phase synchronous motors are widely used. Generally, in a three-phase synchronous motor, the rotational position of the rotor having magnets is detected by magnetic detection element such as a hall IC. Based on the detection result, the armature coils on the stator side are excited sequentially to rotate the rotor. Some motors can be driven by sinusoidal current with the use of accurate rotational position detectors such resolvers, encoders, and GMR sensors, thereby reducing the oscillation or noise of a torque ripple.

However, if such a rotational position detector becomes defective, the three-phase synchronous motor never ceases to rotate. This is true of resolvers, encoders, and GMR sensors used as rotational position detectors. Since failure of rotational position detectors leads to malfunction or abnormal operation in the case of the drive device for a three-phase synchronous motor such as an electric power steering device, improvements have been called for.

The invention disclosed in Patent Document 1 has, in addition to a rotational position detector, rotational position estimating means for estimating the rotational position of the rotor from the voltage and current of the three-phase synchronous motor when the rotational position detector is defective. The output of the rotational position estimating means is used in place of the output of the rotational position detector, whereby the three-phase synchronous motor is driven stably at the time of failure of the rotational position detector.

PRIOR ART DOCUMENT

Patent Document

Patent Document 1: JP-2010-22196-A

SUMMARY OF THE INVENTION

Problems to be Solved by the Invention

If the rotational position estimating means is used in place of the rotational position detector at the time of failure of the latter as in Patent Document 1, the drive of the three-phase synchronous motor can be continued. However, this results in the difference between the actual rotor position and the estimated rotor position, which reduces the output torque of the three-phase synchronous motor. Thus, an alternative method would be to use two rotational position detectors, such as resolvers, encoders, GMR sensors, or other highly accurate rotational position detectors, and if one of the two rotational position detectors is defective, use the other. However, under this method, which one of the two rotational position detectors is defective is undeterminable. Determining which one is defective requires three or more rotational position detectors, which will inevitably increase costs.

An object of the invention is to provide a drive device for a three-phase synchronous motor that is capable of improving the reliability of the rotational position detectors of the three-phase synchronous motor without increasing their costs.

Means for Solving the Problems

The invention provides a drive device for controlling a three-phase synchronous motor based on a signal from a rotational position detector that detects a rotational position of the three-phase synchronous motor, the rotational position detector being a redundant system including a first rotational position detector and a second rotational position detector, the drive device including rotational position estimating means for calculating a rotational position using a control status in which a rotational speed of the three-phase synchronous motor is from 0 to a rated speed. If an abnormality of either the first rotational position detector or the second rotational position detector is detected, a properly functioning one of either the first rotational position detector or the second rotational position detector is identified based on a rotational position calculated by the rotational position estimating means.

Effect of the Invention

In a drive device for a three-phase synchronous motor according to a preferred embodiment of the invention, rotational position estimating means is used to determine which one of its two rotational position detectors is defective. By doing so, the three-phase synchronous motor can be operated without its output torque being reduced due to the failure of one of the two rotational position detectors.

Other objects and features of the invention will become apparent upon reading the following embodiments.

MODES FOR CARRYING OUT THE INVENTION

We will now describe a power conversion device according to an embodiment of the invention with reference to the accompanying drawings. Throughout the drawings, like elements are referred to by like characters, and duplicate explanation will not be given.

Embodiment 1

Referring first to FIGS. 1 through 4, we describe a drive device for a three-phase synchronous motor according to Embodiment 1 of the invention.

Figure 1:
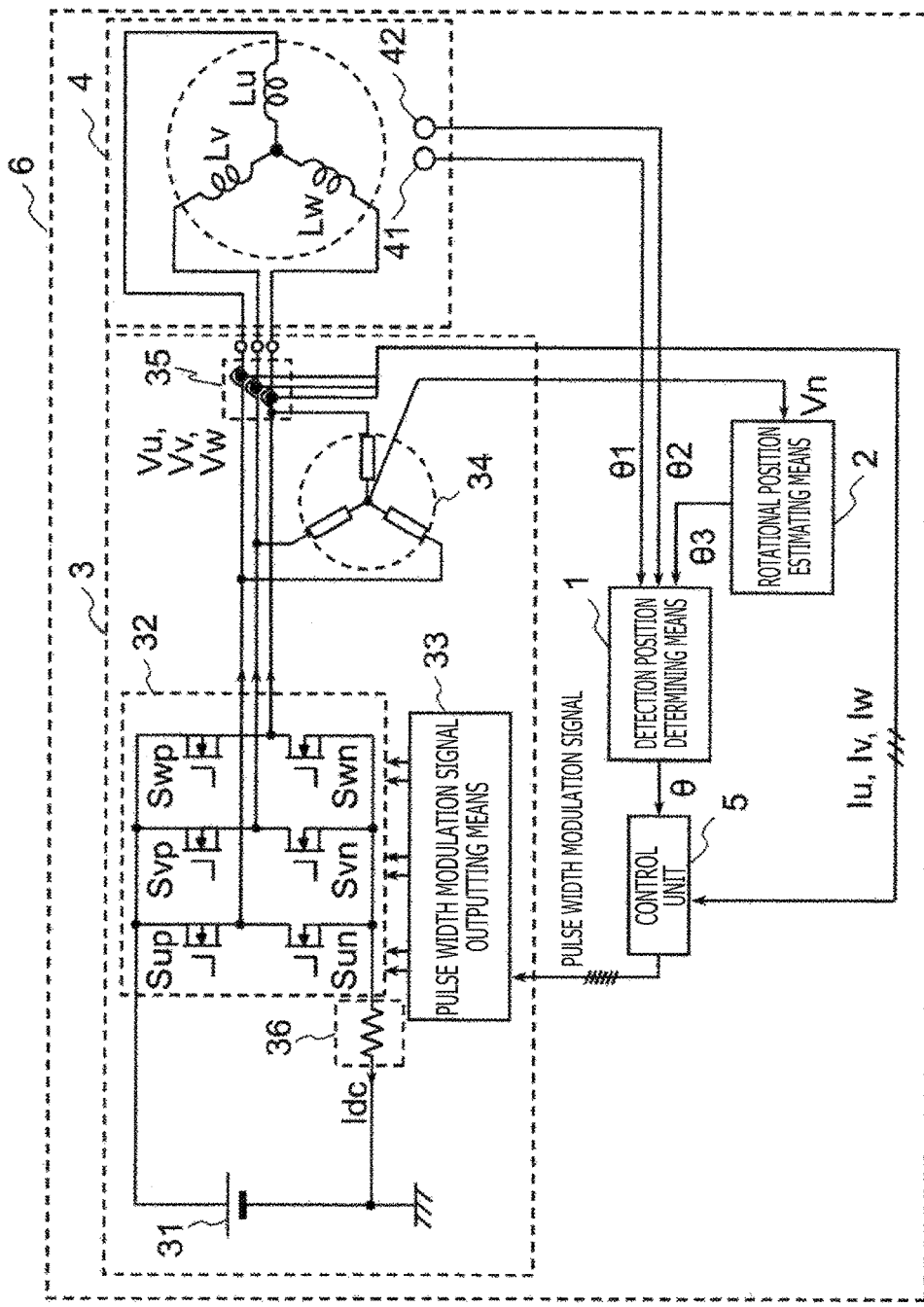
FIG. 1 is a diagram illustrating the structure of a drive device for a three-phase synchronous motor according to Embodiment 1 of the invention.

FIG. 1 illustrates the structure of a drive device 6 for a three-phase synchronous motor. The drive device 6 for a three-phase synchronous motor is used to drive a three-phase synchronous motor 4. The drive device 6 for a three-phase synchronous motor of the present embodiment includes detection position determining means 1; rotational position estimating means 2; a power converter 3 and the three-phase synchronous motor 4 to be driven; and a control unit 5.

A feature of the drive device of the present embodiment is that the rotational position estimating means 2 determines whether a first rotational position detector 41 and a second rotational position detector 42 are defective (abnormal) or not and uses the properly functioning one of the rotational position detectors to drive the three-phase synchronous motor 4.

As illustrated in FIG. 1, the detection position determining means 1 receives the output θ1 of the first rotational position detector 41, the output θ2 of the second rotational position detector 42, and the output θ3 of the rotational position estimating means 2 to output a rotational position θ.

Figure 2:
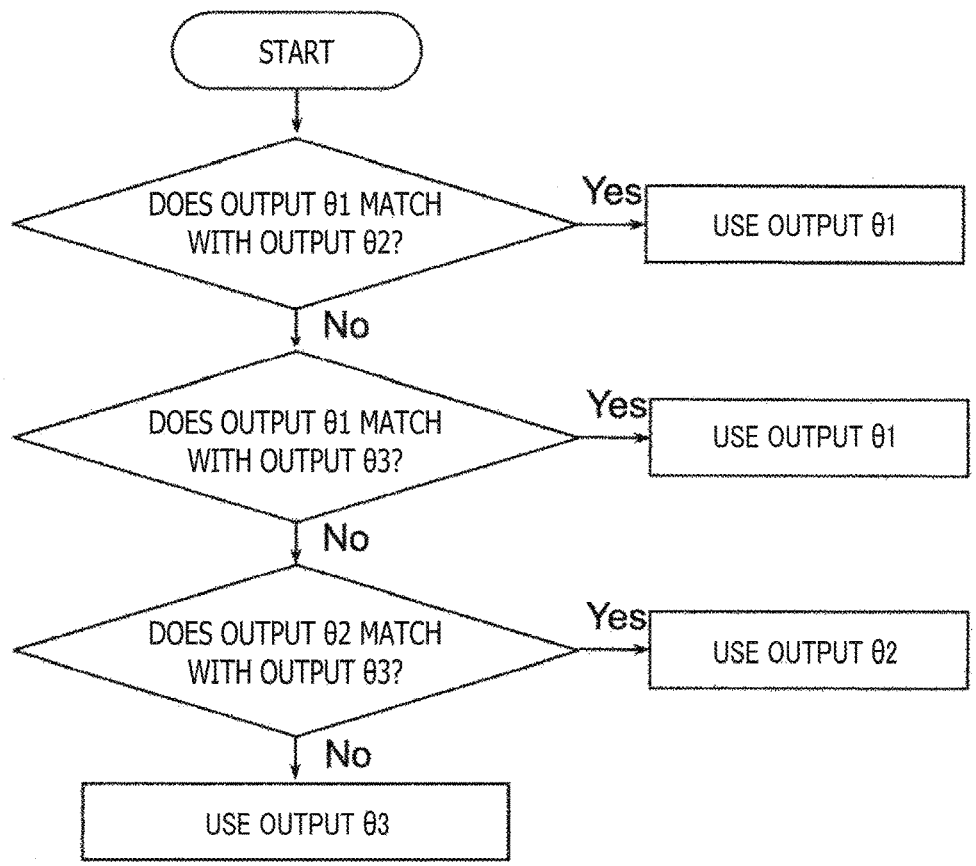
FIG. 2 is a flowchart illustrating the process performed by detection position determining means 1.

FIG. 2 is a flowchart illustrating the process performed by the detection position determining means 1. The detection position determining means 1 first determines whether the outputs θ1 and θ2 of the two rotational position detectors are substantially matched or not. If they are substantially matched, the output θ1 is used. It should be noted that while the present embodiment is designed to use θ1, θ2 can instead be used.

If θ1 and θ2 are different from each other, it can be determined that either the rotational position detector 41 or the rotational position detector 42 is defective. However, which one of either the rotational position detector 41 or the rotational position detector 42 is defective is undeterminable.

Thus, the output θ3 of the rotational position estimating means 2 is also used to determine which one is functioning properly. To do this, it is first determined whether θ1 and θ3 are substantially matched. If the outputs are substantially matched, it is determined that the rotational position detector that has output the value θ1 is functioning properly, and θ1 is used. If, on the other hand, the outputs θ1 and θ3 are different, it is then determined whether θ2 and θ3 are substantially matched or not. If the outputs are substantially matched, it is determined that the rotational position detector that has output the value θ2 is functioning properly, and θ2 is used. If θ2 and θ3 are different from each other, θ3 is used instead.

For the output values θ1, θ2, and θ3 to be compared to each other, comparisons based on the same time are performed with the three positions corrected by performing correction of the detection timings of the rotational position detectors. Thus, since the rotational positions having the same detection timing can be properly detected, misdetection of failure of the rotational position detectors can be avoided during comparison of the rotational positions.

By the detection position determining means 1 performing the process of FIG. 2, even if either the first rotational position detector 41 or the second rotational position detector 42 is defective, the properly functioning detector can be selected. As a result, the same torque as in normal operation can be extracted from the three-phase synchronous motor. In addition, even if both the first rotational position detector 41 and the second rotational position detector 42 are defective, the use of the rotational position estimating means 2 makes it possible to maintain the drive of the three-phase synchronous motor and ensure redundancy.

Figure 3:
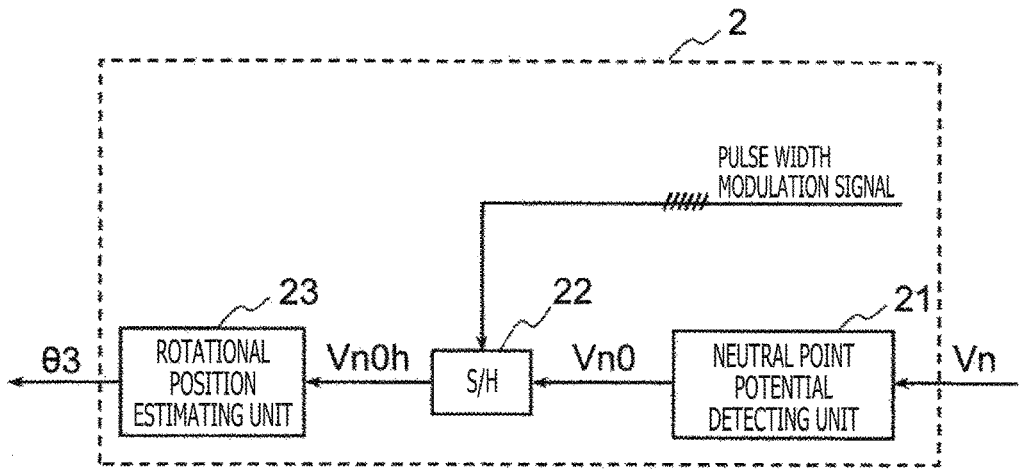
FIG. 3 is a block diagram illustrating rotational position estimating means 2 that involves the use of a neutral point potential.
Figure 4:
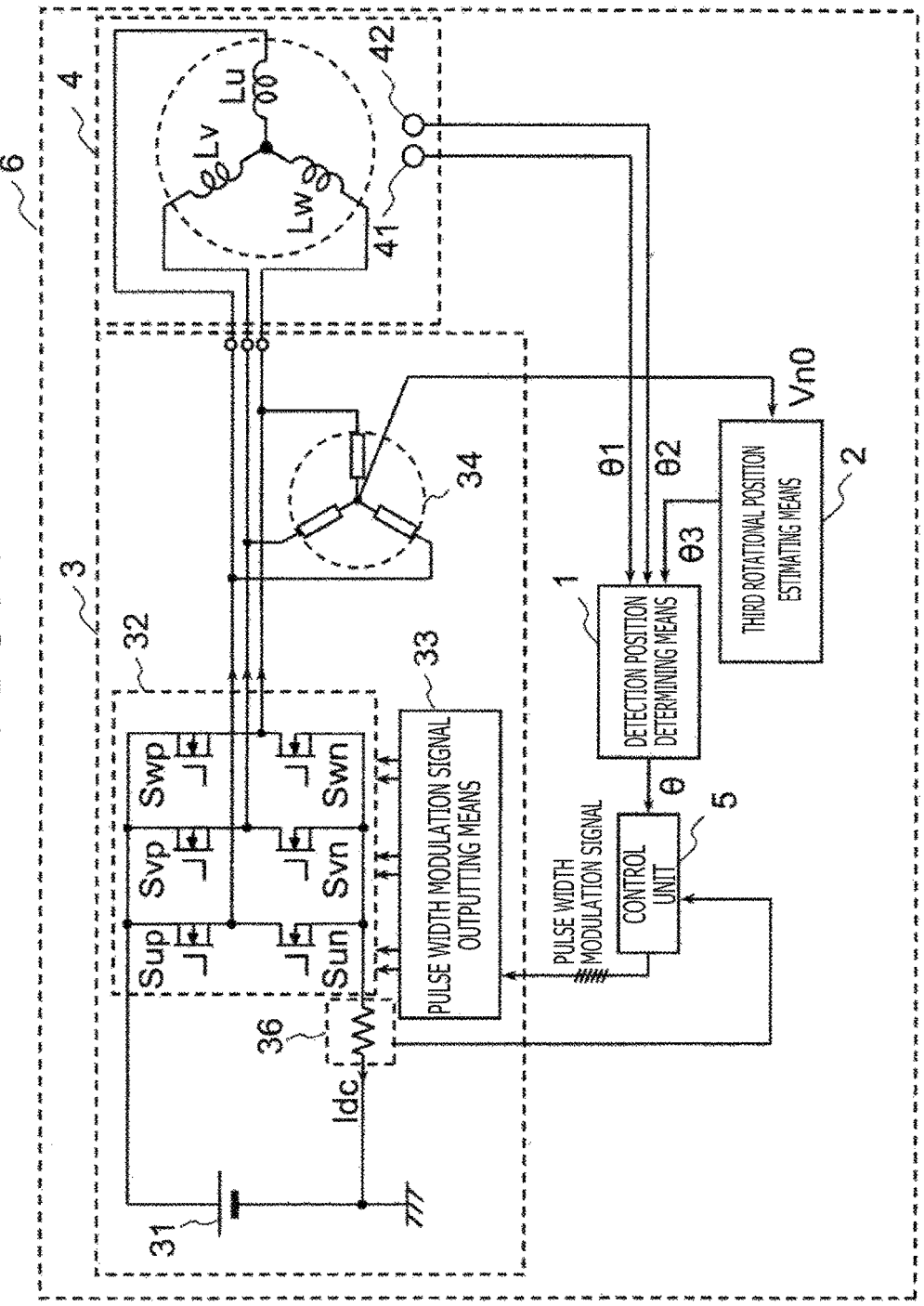
FIG. 4 is a diagram illustrating the structure of a drive device for a three-phase synchronous motor in which a shunt current detector 36 is used for current detection.

FIG. 3 illustrates the structure of the rotational position estimating means 2. The rotational position estimating means 2 uses a virtual neutral point Vn to estimate a rotational position estimating value θ3. There are known techniques for estimating the rotational position estimating value θ3 from the virtual neutral point Vn detected, one of which is presented below. The rotational position estimating means 2 includes a neutral point potential detecting unit 21, a sample/hold unit 22, and a rotational position estimating unit 23.

The neutral point potential detecting unit 21 detects a virtual neutral point potential Vn0 based on a pulse-width modulation signal output from pulse-width modulation signal outputting means 33. There are known techniques for detecting the virtual neutral point potential Vn0 from the three-phase synchronous motor 4, which, however, will not be described herein since they do not constitute a primary feature of the invention.

The sample/hold unit 22 is an AD converter used to perform sampling/quantizing (sampling) on an analog signal output from the neutral point potential detecting unit 21. The sample/hold unit 22 performs sampling on the virtual neutral point potential Vn0 in synchronization with the pulse-width modulation signal output from the pulse-width modulation signal outputting means 33. The sample/hold unit 22 then outputs the sampling result (Vn0$h$) to the rotational position estimating unit 23 as a digital signal.

The rotational position estimating unit 23 calculates an estimating value θ3 of the rotational position of the three-phase synchronous motor 4 from the neutral point potential sampled by the sample/hold unit 22. The estimate result is output as the output θ3 of the rotational position estimating means 2.

A feature of the rotational position estimating means 2 is that torque can be output when the rotational speed of three-phase synchronous motor is 0. While we have described the use of the virtual neutral point Vn to estimate the rotational position estimating value θ3 as an example of the rotational position estimating means 2, there are still other methods that can be employed, including a method involving the use of magnetic saturation induced voltage and a method utilizing differences in the saliency of the three-phase synchronous motor 4. Also, the three-phase winding connecting point (neutral point) can be extracted directly and detected in place of the virtual neutral point. Even if the three-phase synchronous motor 4 is in halt status, the rotational position estimating means 2 can detect the rotational position, so that torque can be output.

By comparing θ1 and θ2 against the output θ3 of the rotational position estimating means 2, abnormalities of the first rotational position detector 41 and the second rotational position detector 42 are detected. As a result, the three-phase synchronous motor 4 can be started up from halt status with the use of the output θ3 of the rotational position estimating means 2 functioning properly.

Referring back to FIG. 1, the control unit 5 generates a pulse-width modulation signal from the output θ of the detection position determining means 1. Based on the pulse-width modulation signal output from the control unit 5, the power converter 3 applies voltage to the three-phase synchronous motor 4. The power converter 3 includes a direct current power supply 31, a power conversion circuit 32, the pulse-width modulation signal outputting means 33, a virtual neutral point potential detecting circuit 34, a three-phase current detector 35, and a shunt current detector 36.

The direct current power supply 31 is used to supply electric current to the power conversion circuit 32. The power conversion circuit 32 includes six switching elements Sup to Swn. The pulse-width modulation signal outputting means 33 is a driver used to input the pulse-width modulation signal, output from the control unit 5, to the power converter 32. The neutral point potential detecting unit 34 detects the virtual neutral point Vn to be used for the rotational position estimating means. In place of the virtual neutral point Vn, the neutral point potential of the three-phase synchronous motor 4 can be directly detected. The three-phase current detector 35 detects three-phase currents Iu, Iv, and Iw flowing through the three-phase synchronous motor 4. The detection of the currents in the three-phase synchronous motor 4 is preferably performed, as the current detector 35 does, such that the three-phase currents supplied from the power conversion circuit 32 to the three-phase synchronous motor 4 are directly detected. However, as in FIG. 4, it is also possible to detect the direct current Idc flowing a shunt resistor 36 to use the reconstructed currents that serve as the three-phase currents Iu, Iv, and Iw. There are known techniques for reconstructing the three-phase currents Iu, Iv, and Iw from the direct current Idc, which, however, will not be described herein since they do not constitute a primary feature of the invention.

In the drive device for a three-phase synchronous motor according to the above embodiment, the rotational position estimating means is used to determine which one of the two rotational position detectors is detective. By doing so, even if one of the two rotational position detectors is defective, the operation of the three-phase synchronous motor can be continued without decreasing its output torque. The rotational position estimating means of the present embodiment can be implemented without adding any hardware such as a rotational position detector. Therefore, it is possible to improve the reliability of the rotational position detectors of the three-phase synchronous motor without increasing the costs of the rotational position detectors.

Embodiment 2

Figure 5:
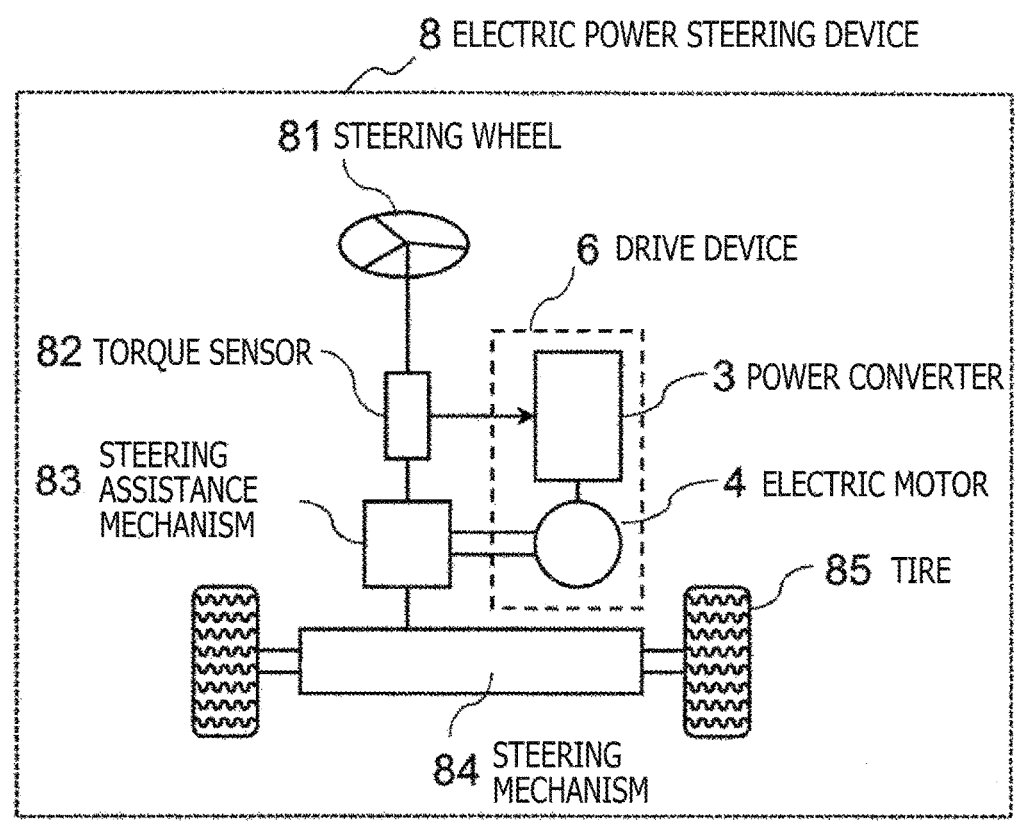
FIG. 5 is a diagram illustrating the structure of an electric power steering device according to Embodiment 2 of the invention.
Figure 6:
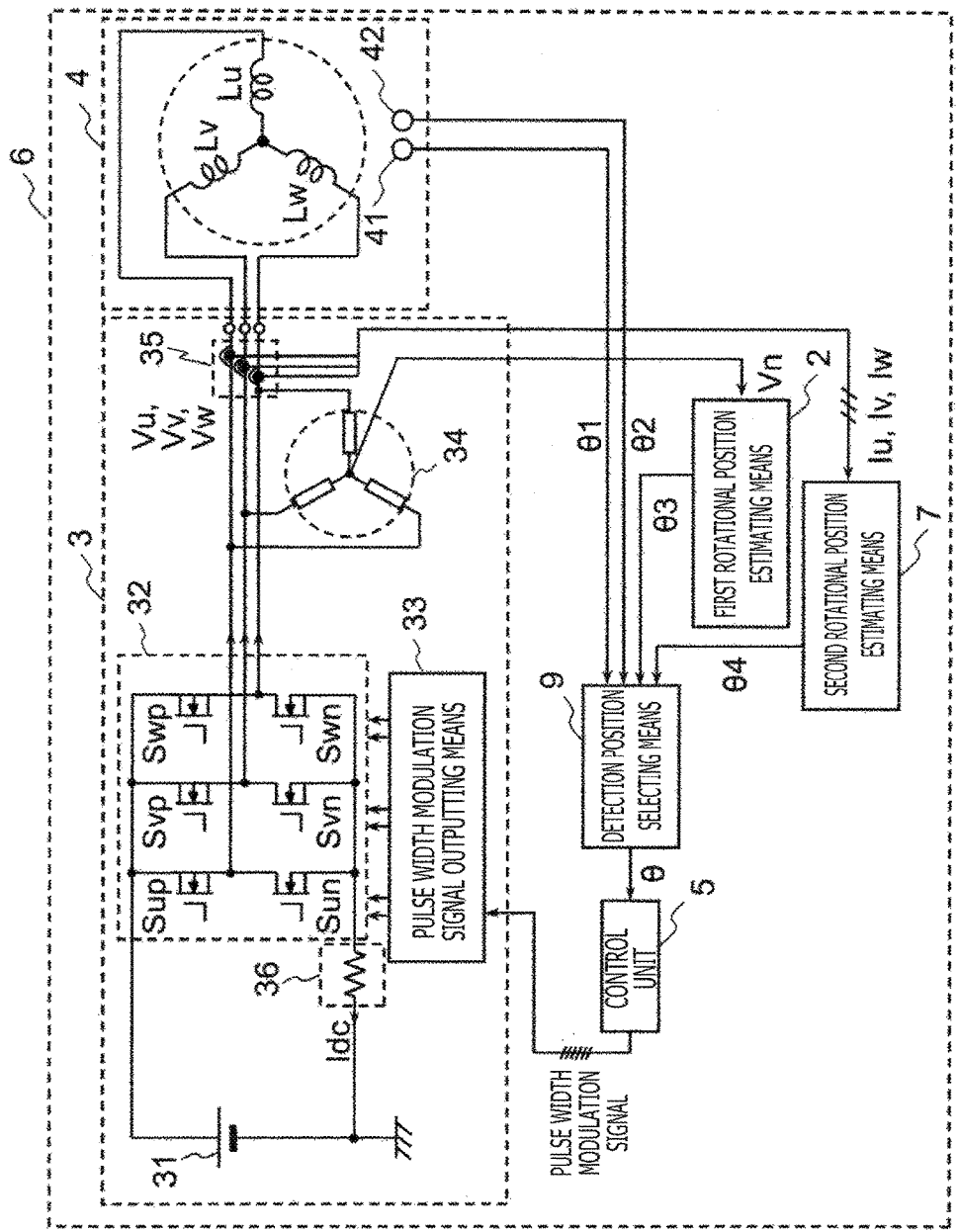
FIG. 6 is a block diagram illustrating the structure of a drive device for a three-phase synchronous motor according to Embodiment 2.
Figure 7:
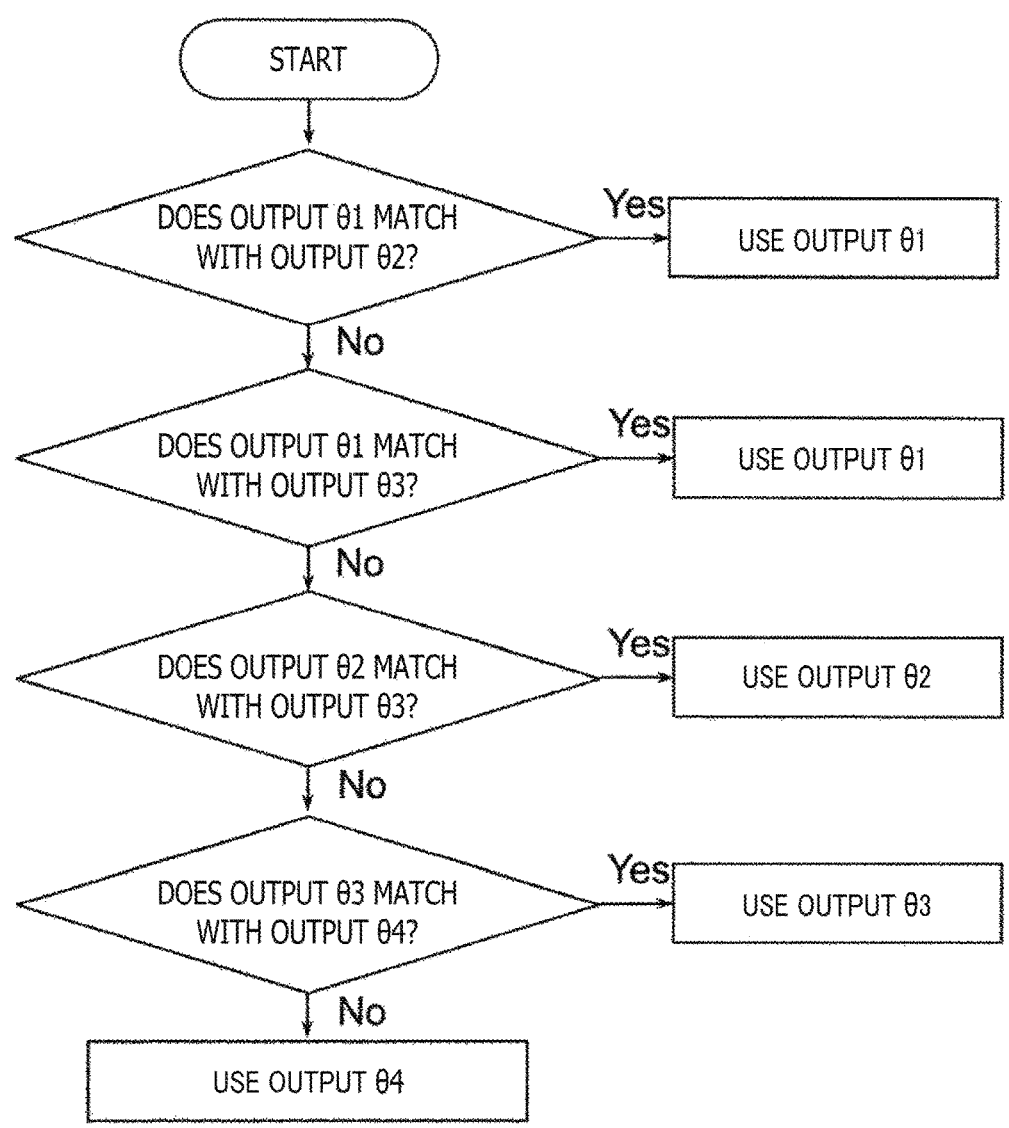
FIG. 7 is a flowchart illustrating the process performed by detection position selecting means 9.

Referring FIGS. 5 to 7, we describe electric power steering according to Embodiment 2 of the invention.

FIG. 5 illustrates the structure of an electric power steering device 8. When a driver operates a steering wheel 81, a torque sensor 82 detects the rotational torque of the steering wheel 81. The torque detected by the torque sensor 82 is input to a drive device 6 so that based on a command corresponding to the torque, the three-phase synchronous motor 4 outputs torque. The torque output from the three-phase synchronous motor 4 is used to assist the steering force through a steering assistance mechanism 83 and is also output to a steering mechanism 84. The steering mechanism 84 is used to steer tires 85.

FIG. 6 illustrates the structure of the drive device 6 for a three-phase synchronous motor of Embodiment 2. In this embodiment, rotational position estimating means includes first rotational position estimating means 2 and second rotational position estimating means 2. Thus, Embodiment 2 differs from Embodiment 1 in that the second rotational position estimating means 7 is provided in Embodiment 2.

For the first rotational position estimating means 2 and the second rotational position estimating means 7, it is possible to use two of the following methods: the method of Embodiment 1 based on the virtual neutral point Vn, a method based on magnetic saturation induced voltage, and a method on utilizing the saliency of the three-phase synchronous motor 4. A feature of these three rotational position estimating means is that even when the rotational speed of the three-phase synchronous motor is 0, the drive of the three-phase synchronous motor can be controlled to output torque. Since an electric power steering device having such rotational position estimating means allows output of torque even when the rotational speed of the three-phase synchronous motor is 0, it is possible to assist drive the steering wheel of a driver even if, for example, a tire of the vehicle has climbed up a step.

With the above feature, the first rotational position estimating means 2 can estimate the rotational position even when the three-phase synchronous motor 4 is in halt status. As a result, abnormalities of the first rotational position detector 41 and the second rotational position detector 42 can be detected by comparing θ3 against θ1 and θ2. In addition, even when the three-phase synchronous motor 4 is in halt status with the vehicle speed being equal to or lower than a predetermined value, the first rotational position estimating means 2 can also estimate the rotational position. As a result, abnormalities of the first rotational position detector 41 and the second rotational position detector 42 can be detected 42 by comparing θ3 against θ1 and θ2.

Moreover, even when the rotational speed of the three-phase synchronous motor 4 is 0 with the vehicle speed being equal to or lower than a predetermined value, abnormalities of the first rotational position detector 41 and the second rotational position detector 42 can also be detected by comparing the output θ3 of the first rotational position estimating means 2 against θ1 and θ2. As a result, the drive of the three-phase synchronous motor 4 can be continued with the use of the output θ3 of the first rotational position estimating means 2 functioning properly, thereby assisting the steering force.

FIG. 7 illustrates the process performed by detection position selecting means 9, which constitutes a feature of Embodiment 2. The detection position selecting means 9 receives the output θ1 of the first rotational position detector 41, the output θ2 of the second rotational position detector 42, the output θ3 of the first rotational position estimating means 2, and the output θ4 of the second rotational position estimating means 7 to output a rotational position estimating value θ. The detection position selecting means 9 first determines whether the outputs θ1 and θ2 of the two rotational position detectors are substantially matched or not. If they are substantially matched, the output θ1 is used. If θ1 and θ2 are different from each other, which one is defective is undeterminable. Thus, the output θ3 of the rotational position estimating means 2 is also used to determine which one is functioning properly. To do this, it is first determined whether θ1 and θ3 are substantially matched. If the outputs are substantially matched, θ1 is used. If, on the other hand, the outputs θ1 and θ3 are different, it is then determined whether θ2 and θ3 are substantially matched or not. If the outputs are substantially matched, θ2 is used. If θ2 and θ3 are different from each other, it is further determined whether θ3 and θ4 are substantially matched or not. If the outputs are substantially matched, θ3 is used. If θ3 and θ4 are different from each other, θ4 is used instead.

By the detection position selecting means 9 performing the process of FIG. 7, even if either the first rotational position detector 41 or the second rotational position detector 42 is defective, the properly functioning detector can be used. Thus, in electric power steering, it is possible to assist the steering force similarly as in normal operation.

If the first rotational position detector 41 and the second rotational position detector 42 are both defective, the steering force can be assisted with the use of the first rotational position estimating means 2. Further, if the output of the first rotational position estimating means 2 is also abnormal, the second rotational position estimating means 7 can be used. Thus, a quadruple redundant system can be achieved at a low cost.

If the output θ1 of the first rotational position detector 41 and the output θ2 of the second rotational position detector 41 are both abnormal or both of the detectors are defective, the detection position selecting means 9 uses the output θ3 of the first rotational position estimating means 2 and the output θ4 of the second rotational position estimating means 7. In this case, a driver is notified of the failure, and the output torque of the three-phase synchronous motor is gradually reduced. With this, the driver can stop the vehicle safely even when the electric power steering system goes out of order.

For the output values θ1, θ2, θ3, and θ4 to be compared to each other, comparisons based on the same time are performed with the three positions corrected by performing correction of the detection timings of the rotational position detectors. Thus, since the rotational positions having the same detection timing can be properly detected, misdetection can be avoided during comparison of the rotational positions.

DESCRIPTION OF THE REFERENCE NUMERALS

1: Detection position determining means
2: Rotational position estimating means (first rotational position estimating means)
21: Neutral point potential detecting unit
22: Sample/hold unit
23: Rotational position estimating unit
3: Power converter
31: Direct current power supply
32: Power conversion circuit
33: Pulse-width modulation signal outputting means
34: Virtual neutral point potential detecting circuit
35: Three-phase current detector
36: Shunt current detector
4: Three-phase synchronous motor
41: First rotational position detector
42: Second rotational position detector
5: Control unit
6: Three-phase synchronous motor drive device
7: Second rotational position estimating means
8: Electric power steering device
81: Steering wheel
82: Torque sensor
83: Steering assistance mechanism
84: Steering mechanism
85: Tire
9: Detection position selecting means

The invention claimed is:

1. A drive device for controlling a three-phase synchronous motor based on a signal from a rotational position detector that detects a rotational position of the three-phase synchronous motor,
the rotational position detector being a redundant system including a first rotational position detector and a second rotational position detector,
the drive device comprising rotational position estimating means for calculating a rotational position using a control status in which a rotational speed of the three-phase synchronous motor is from 0 to a rated speed, wherein
if an abnormality of either the first rotational position detector or the second rotational position detector is detected, a properly functioning rotational position detector of either the first rotational position detector or the second rotational position detector is identified based on a rotational position calculated by the rotational position estimating means, and
if an abnormality of either the first rotational position detector or the second rotational position detector is detected, the output torque of the three-phase synchronous motor is made equal to the torque obtained when the first rotational position detector and the second rotational position detector are both functioning properly.

2. The drive device for a three-phase synchronous motor of claim 1, wherein
if an output signal of the first rotational position detector substantially matches an output signal of the second rotational position detector, the three-phase synchronous motor is controlled based on either the output signal of the first rotational position detector or the output signal of the second rotational position detector.

3. The drive device for a three-phase synchronous motor of claim 1, wherein
the three-phase synchronous motor is controlled based on an output signal of the rotational position estimating means when the rotational speed of the three-phase synchronous motor is 0.

4. The drive device for a three-phase synchronous motor of claim 1, wherein
if an output signal of the first rotational position detector does not match an output signal of the second rotational position detector, detection is made such that either the first rotational position detector or the second rotational position detector is abnormal.

5. The drive device for a three-phase synchronous motor of claim 1, wherein
if an abnormality of either the first rotational position detector or the second rotational position detector is detected, driving of the three-phase synchronous motor is continued based on a signal of the properly functioning rotational position detector.

6. The drive device for a three-phase synchronous motor of claim 5, wherein
determination of an abnormality of the rotational position detector is made, the rotational position detector has been determined normal, by comparing the output signal of the rotational position detector that has been determined normal against an output signal of the rotational position estimating means.

7. The drive device for a three-phase synchronous motor of claim 1, wherein a difference between a detection timing of the first and second rotational position detectors and a detection timing of the rotational position estimating means is corrected.

8. An electric power steering device comprising:

a drive device for controlling a three-phase synchronous motor based on a signal from a rotational position detector that detects a rotational position of the three-phase synchronous motor; and a steering assistance mechanism for assisting steering torque using the three-phase synchronous motor, the rotational position detector being a redundant system including a first rotational position detector and a second rotational position detector, the drive device having rotational position estimating means for calculating a rotational position using a control status in which a rotational speed of the three-phase synchronous motor is from 0 to a rated speed, wherein if an abnormality of either the first rotational position detector or the second rotational position detector is detected, a properly functioning one of either the first rotational position detector or the second rotational position detector is identified based on the rotational position calculated by the rotational position estimating means, if an abnormality of either the first rotational position detector or the second rotational position detector is detected, driving of the three-phase synchronous motor is continued based on a signal of the properly functioning rotational position detector, and if an abnormality of either the first rotational position detector or the second rotational position detector is detected, the output torque of the three-phase synchronous motor is made equal to the torque obtained when the first rotational position detector and the second rotational position detector are both functioning properly.

9. The electric power steering device of claim 8, wherein if an output signal of the first rotational position detector substantially matches an output signal of the second rotational position detector, the three-phase synchronous motor is controlled based on either the output signal of the first rotational position detector or the output signal of the second rotational position detector.

10. The electric power steering device of claim 8, wherein the three-phase synchronous motor is controlled based on an output signal of the rotational position estimating means when the rotational speed of the three-phase synchronous motor is 0.

11. The electric power steering device of claim 10, wherein
an abnormality is detected if the outputs of the first and second rotational position detectors do not fall within a steady range with the three-phase synchronous motor being halted.

12. The electric power steering device of claim 11, wherein an abnormality of either the first rotational position detector or the second rotational position detector is detected when a vehicle speed is equal to or less than a predetermined value.

13. The electric power steering device of claim 8, wherein if an output signal of the first rotational position detector does not match an output signal of the second rotational position detector, detection is made such that either the first rotational position detector or the second rotational position detector is abnormal.

14. The electric power steering device of claim 8, wherein determination of an abnormality of the rotational position detector having been determined normal is made by comparing the output signal of the rotational position detector that has been determined normal against an output signal of the rotational position estimating means.

15. The electric power steering device of claim 14, wherein
if it is determined that the first rotational position detector and the second rotational position detector are both abnormal, driving of the three-phase synchronous motor is continued based on the output signal of the rotational position estimating means.

16. The electric power steering device of claim 15, wherein:
the rotational position estimating means includes first rotational position estimating means and second rotational position estimating means;
in the event that the driving of the three-phase synchronous motor is continued based on the output signal of the rotational position estimating means, determination of an abnormality of the rotational position estimating means is made by comparing the output of the first rotational position estimating means against the output of the second rotational position estimating means.

17. The electric power steering device of claim 15, wherein
in the event that the driving of the three-phase synchronous motor is continued based on the output signal of the rotational position estimating means, an output torque of the three-phase synchronous motor is gradually reduced or reduced to 0.

18. The electric power steering device of claim 8, wherein a difference between a detection timing of the first and second rotational position detectors and a detection timing of the rotational position estimating means is corrected.

* * * * *